US009294296B2

(12) United States Patent
Kirschnick et al.

(10) Patent No.: US 9,294,296 B2
(45) Date of Patent: Mar. 22, 2016

(54) AUTOMATED TEST EXECUTION IN A SHARED VIRTUALIZED RESOURCE POOL

(75) Inventors: Johannes Kirschnick, Bristol (GB); Sebastian Gaisbauer, Röhrnbach (GB); Jerome Rolia, Kanata (CA); Nigel Edwards, Bristol (GB)

(73) Assignee: Hewlett Packard Enterprise Development LP, Houston, TX (US)

( * ) Notice: Subject to any disclaimer, the term of this patent is extended or adjusted under 35 U.S.C. 154(b) by 1728 days.

(21) Appl. No.: 12/363,558

(22) Filed: Jan. 30, 2009

(65) Prior Publication Data

US 2010/0198960 A1    Aug. 5, 2010

(51) Int. Cl.
| G06F 15/173 | (2006.01) |
| H04L 12/26 | (2006.01) |
| G06F 11/34 | (2006.01) |
| G06F 11/36 | (2006.01) |

(52) U.S. Cl.
CPC ........ *H04L 12/2697* (2013.01); *G06F 11/3414* (2013.01); *G06F 11/3433* (2013.01); *H04L 43/50* (2013.01); *G06F 11/3672* (2013.01); *G06F 2201/815* (2013.01)

(58) Field of Classification Search
CPC .. H04L 12/2697; H04L 43/50; G06F 11/3672
USPC .................................. 709/223, 224
See application file for complete search history.

(56) References Cited

U.S. PATENT DOCUMENTS

| 5,303,166 | A | 4/1994 | Amalfitano et al. |
| 6,601,020 | B1 * | 7/2003 | Myers ........................ 702/186 |
| 7,769,735 | B2 | 8/2010 | Wasserman et al. |
| 2003/0018513 | A1 | 1/2003 | Hoffman et al. |
| 2003/0069779 | A1 | 4/2003 | Menninger et al. |
| 2004/0102980 | A1 | 5/2004 | Reed et al. |
| 2004/0103017 | A1 | 5/2004 | Reed et al. |
| 2005/0154628 | A1 | 7/2005 | Eckart et al. |
| 2006/0136579 | A1 * | 6/2006 | Linville et al. ................ 709/223 |

(Continued)

FOREIGN PATENT DOCUMENTS

WO    WO2007065195    6/2007

OTHER PUBLICATIONS

Jerry Rolia, Ludmila Cherkasova, Martin Arlitt, A Capacity Management Service for Resource Pools, Jul. 2005, ACM, pp. 229-237.*

(Continued)

*Primary Examiner* — Hieu Hoang
(74) *Attorney, Agent, or Firm* — Mannava & Kang

(57) ABSTRACT

In a computer-implemented method for automated test execution in a shared virtualized resource pool, a test description containing at least one model for a service under test (SUT) is received and one or more infrastructure configurations to be tested by resources in the shared virtualized resource pool based upon the test description are identified. In addition, a service lifecycle management (SLiM) tool is interacted with to cause the SUT and a load source to be created, the SLiM tool is directed to instantiate the SUT and the load source on the one or more infrastructure configurations in the shared virtualized resource pool for the SUT, and the SLiM tool and the load source are interacted with to receive performance data related to performance of the SUT under one or more loads generated by the load source.

15 Claims, 4 Drawing Sheets

(56) References Cited

U.S. PATENT DOCUMENTS

| | | | |
|---|---|---|---|
| 2006/0184414 | A1 | 8/2006 | Pappas et al. |
| 2007/0112615 | A1 | 5/2007 | Maga et al. |
| 2007/0219944 | A1 | 9/2007 | Liu et al. |
| 2008/0263400 | A1 | 10/2008 | Waters et al. |
| 2009/0300423 | A1* | 12/2009 | Ferris ............................. 714/38 |

OTHER PUBLICATIONS

M. Andreica, N. Tapus, A. Iosup, D.H.J. Epema, C. Dumitrescu, I. Raicu, I. Foster, M. Ripeanu, Towards ServMark, and Architecture for Testing Grids, Nov. 2006, CoreGRID, pp. 1-12.*

Sebastian Gaisbauer et al., "VATS: Virtualized-Aware Automated Test Service", Quantitative Evaluation of Systems, 2008. QEST '08. Fifth Int'l Conference, Sep. 14-17, 2008.

Jerry Rolia et al., "Adaptive information Technology for Service Lifecycle Management", HP Laboratories, HPL-2008-80, Jul. 21, 2008.

Xueling Shu et al., "A Tool for Automated Performance Testing of Java3D Applications in Agile Environments", Int'l Conference on Software Eng'g Advances(ICSEA 2007).

Diwakar Krishnamurthy et al., "A Synthetic Workload Generation Technique for Stress Testing Session-Based Sys.", IEEE Transactions on Software Eng'g, vol. 32, No. 11, Nov. 2006.

Catalin Dumitrescu et al.,"DiPerF: an automated Distributed PERformance testing Framework", In Proc. 5st IEEE/ACM Internal Workshop on Grid Computing, 2004.

Krishnamurthy, "A Synthetic Workload Generation for Stress Testing Session-Based Systems", (Doctoral thesis: Rolia—thesis advisor), Carleton University Ottawa, Ont., Canada 2004; ISBN:0-612-94203-1; pp. 1-171.

Office Action dated Dec. 23, 2011, U.S. Appl. No. 12/252,395, filed Oct. 16, 2008.

Parpatakam, "Performance Testing Why and How?", HP talk; 2007; pp. 1-37.

Vail, "Stress, Load, Volume, Performance, Benchmark and Base Line Testing Tool Evaluation and Comparison", handout at educational seminar; 2005; pp. 1-213.

* cited by examiner

AUTOMATED TEST EXECUTION IN A SHARED VIRTUALIZED RESOURCE POOL

CROSS-REFERENCE TO RELATED APPLICATIONS

The present application has the same Assignee and shares some common subject matter with U.S. patent application Ser. No. 12/363,581, filed on even date herewith, by Jerome Rolia et al., U.S. patent application Ser. No. 12/363,597, filed on even date herewith, by Jerome Rolia et al., and U.S. patent application Ser. No. 12/252,395, filed on Oct. 16, 2008, by Jerome Rolia et al., which claims the benefit of priority to U.S. Provisional Patent Application No. 61/001,483, filed on Oct. 31, 2007. The disclosures of the above-identified applications for patent are hereby incorporated by reference in their entireties.

BACKGROUND

There has been substantial growth in the purchase of information technology as a service from internal and external service providers and this trend appears to be increasing rapidly. This growth is enabled by the trend towards cloud computing, in which, services run on shared virtualized resource pools that are accessible via Intranets or the Internet. As this cloud computing paradigm matures, there is also an increasing trend for businesses to exploit the paradigm to support business critical services such as sales and delivery, and supply chain management. Those services will have performance requirements and are likely to place significant loads on cloud infrastructures.

With the increasing loads currently being placed on cloud computing infrastructures, it is becoming increasingly important to evaluate the cloud computing infrastructures to explore the capabilities of the systems through testing. For instance, testing of the cloud computing infrastructures to evaluate the performance impacts of running various services in the cloud environments, as well as getting an overview of the individual performance of parts of the system, would provide beneficial understanding of the systems in the cloud computing infrastructures.

In addition, it is becoming increasingly important to create test systems configured to accurately model the workloads imposed upon the systems contained in the cloud computing infrastructures. One modeling method utilizes benchmarks to impose a synthetic workload on the cloud computing infrastructures being tested. A typical business process, for instance, ordering, may invoke a number of discreet business objects in order to complete the business process. In addition, a given business object may be characterized by a particular sequence of interdependent requests which are exchanged between entities in the enterprise application system. In other words, the sequence of interdependent requests should be performed correctly in order to correctly implement the business process. Thus, a benchmark for modeling the enterprise application system should accurately reflect the correct sequence and volume of interdependent requests. Otherwise, an incorrect sequence of interdependent requests may cause an error condition that does not accurately model the demands placed upon the enterprise application system.

However, conventional stress testing of cloud computing infrastructures is generally based upon a small number of pre-existing benchmarks which typically utilize a small subset of business objects. As a result, it is difficult to generate a synthetic workload which accurately models the actual load patterns expected on the cloud computing infrastructures. Alternatively, creating a customized benchmark which is representative of a given enterprise is typically too time consuming and expensive for many users.

It would thus be beneficial to have methods for verifying that services can be provided at required throughput levels while using an acceptable quantity of resources.

BRIEF DESCRIPTION OF DRAWINGS

The embodiments of the invention will be described in detail in the following description with reference to the following figures.

DETAILED DESCRIPTION OF EMBODIMENTS

Figure 1:
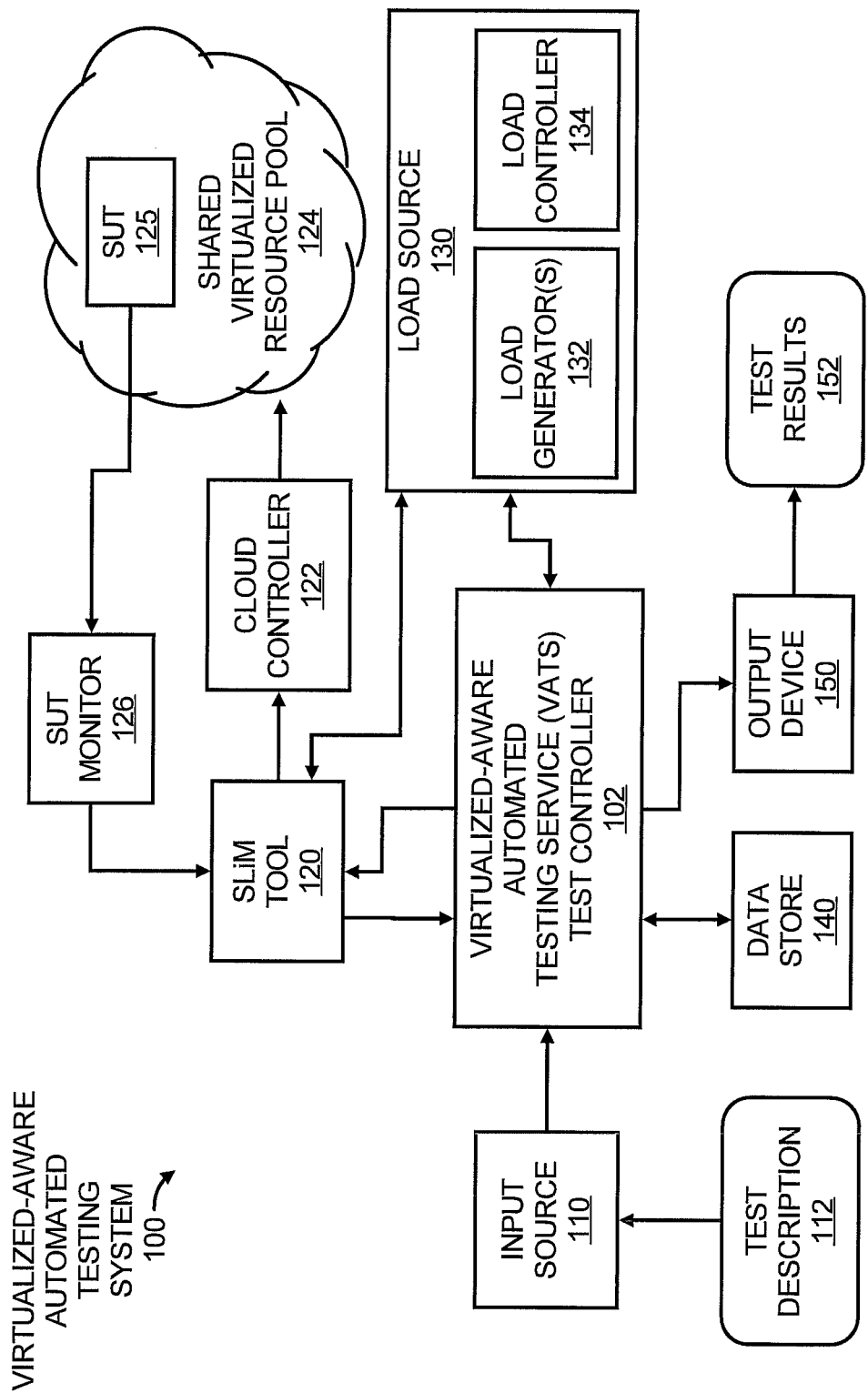
FIG. 1 illustrates a block diagram of a virtualized-aware automated testing system, according to an embodiment of the invention.

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

Disclosed herein is a virtualized-aware testing service (VATS) test controller and a method for automated test execution in a shared virtualized resource pool. The VATS test controller and method generally enable the automated and systematic study of performance for services that may be deployed to shared virtualized resource pools. More particularly, the VATS test controller is configured to receive requests for tests and for each test, orchestrate the provisioning of systems in a shared virtualized resource pool from a cloud controller, orchestrate the deployment of a service under test (SUT) and load generation facilities to the infrastructure, orchestrate the execution of the test, report results for the test, and orchestrate release of the resources back into the shared virtualized resource pool (cloud). In performing these and other functions, the VATS test controller interfaces with a service lifecycle management (SLIM) system, a cloud controller, and a load source.

The VATS test controller and method disclosed herein may be employed to provide assurances that a service may be hosted in a high quality, cost-effective manner. In addition, the VATS test controller and method disclosed herein enable service providers to deliver correctly sized infrastructures, as well as to deliver correctly sized services running on the infrastructure, thereby minimizing over-provisioning and under-provisioning. Moreover, the VATS test controller takes advantage of the ability in shared virtualized resource pools to quickly change resource levels and infrastructure topologies during testing.

Through implementation of the VATS test controller and method disclosed herein, full insight into the performance of a system from the infrastructure and software points of view may be determined. Full insight of the system performance may be gained because the VATS test controller and method disclosed herein are configured to evaluate multiple workloads that stress different parts of the system individually or concurrently. In addition, detailed analyses from the performance results may be constructed to gather information about the exact utilization of provided resources of a service instance. Furthermore, the VATS test controller and method are operated in a fully automated manner and thus tests using multiple variations or parameters may be performed without user intervention and may also be performed in parallel to thereby increase the speeds at which the tests are performed.

With reference first to FIG. 1, there is shown a block diagram of a virtualized-aware automated testing system 100, according to an example. In one regard, the methods disclosed herein below may be implemented in the automated testing system 100 as discussed in greater detail herein below. It should be understood that the automated testing system 100 may include additional elements and that some of the elements described herein may be removed and/or modified without departing from a scope of the automated testing system 100.

The automated testing system 100 is depicted as including a virtualized-aware automated testing service (VATS) test controller 102, an input source 110, a service lifecycle (SLiM) tool 120, cloud controller 122, a service under test (SUT) monitor 126, a load source 130, a data store 140, and an output device 150. Also shown in FIG. 1 is a shared virtualized resource pool 124, which comprises a cloud computing environment where services run on shared virtualized resource pools that are accessible via Intranets or the Internet. The use of the cloud computing environment makes it possible for the VATS test controller 102 to rapidly change resource levels and infrastructure topologies.

According to an example, the VATS test controller 102 comprises a hardware device, such as, a circuit or multiple circuits arranged on a board. According to another example, the VATS test controller 102 comprises software comprising code stored, for instance, in a volatile or non-volatile memory, such as DRAM, EEPROM, MRAM, flash memory, floppy disk, a CD-ROM, a DVD-ROM, or other optical or magnetic media, and the like. In this example, the VATS test controller 102 comprises a software module stored in a memory. According to a further example, the VATS test controller 102 comprises a combination of hardware and software modules.

In any regard, the VATS test controller 102 is generally configured to perform a number of functions in the automated testing system 100. As discussed in greater detail herein below, the VATS test controller 102 comprises code or is otherwise configured to automatically execute tests, manipulates a virtualized infrastructure (for instance, a cloud computing environment) to perform the tests under multiple configurations and collects performance information of resources in executing the tests under the multiple configurations. In one example, VATS test controller 102 enables a determination of how a service instance behaves under a variety of parameter changes. For instance, the VATS test controller 102 may be implemented to verify that response time goals for a service may be satisfied at required throughput levels while using an acceptable quantity of service provider resources.

As further shown in FIG. 1, the VATS test controller 102 is in communication with the input source 110, through which the VATS test controller 102 receives test descriptions 112. The VATS test controller 102 analyzes the test descriptions 112 in, for instance, determining configurations that the infrastructure is to have in performing the tests. Generally speaking, a test description 112 contains at least one model for a service under test (SUT) 125 and a description for the test, which includes, for instance, high level goals of metrics that a user would like to test or evaluate. According to an example, the test description 112 includes multiple configurations for an infrastructure to be tested by the automated testing system 100. In this example, the VATS test controller 102 may cause the multiple infrastructure configurations to be tested by the resources in the shared virtualized resource pool 124. In addition, because the infrastructure on which the tests are performed is provided by the shared virtualized resource pool 124, the VATS test controller 102 may cause the multiple infrastructure configurations to be tested either serially or in parallel with each other.

By way of a particular example, the test description 112 may define multiple configurations in which an application server in the shared virtualized resource pool 124 has 1 GB of memory in one configuration and 2 GB of memory is another configuration, and the user of the automated testing system 100 is seeking to determine how a system including the application server with the different memory sizes behaves as load on the application server is increased. As another particular example, the test description may define whether other loads running on multiple application servers in the shared virtualized resource pool 124 are to be considered in the test of a particular application server. As a further particular example, the test description may define whether loads are to run on top of shared resources in the shared virtualized resource pool 124, for instance, to determine the performance impact of such an arrangement and to test for scalability of performance of the application servers.

Generally speaking, therefore, the VATS test controller 102 is configured to analyze the test description 112 to obtain an understanding of the various parameters that are to be utilized in performing the tests. From this understanding, the VATS test controller 102 identifies, for instance, the number of different system configurations (for instance, different configurations of application servers, network switches, memories, etc.) that are to be tested, the configurations of the different systems that are to be tested, the loading conditions on the different systems, etc.

The VATS test controller 102 is thus figured to be instantiated and deployed to fulfill the test request contained in the test description 112. Once instantiated, the VATS test controller 102 is configured to interact with the SLiM tool 120 and the load source 130 to cause a service under test (SUT) 125 to be created. Generally speaking, the SLiM tool 120 is configured to automatically configure the components in an identified service using the cloud controller 122 for provisioning the infrastructure and to also create the SUT 125. More particularly, the VATS test controller 102 uses the SLiM tool 120 to provide a model-driven environment where services are described using models. The model for a service has sufficient information to enable the creation and management of a service instance in the shared virtualized resource 124. In addition, in creating and managing a service instance, the SLiM tool 120 performs service customization, deployment, and run-time management. Customization enables feature selection for a service, for instance, whether certain functionality will be included. Deployment requires the acquisition of virtual infrastructures, the deployment of software and images to those virtual infrastructures, and the configuration of communication paths. Run-time management includes monitoring and change management for the service instance.

Through the model of the service as expressed in the SLiM tool 120, a service instance exposes operations that enables service customization, that is, feature selection, and change management for its virtual infrastructure and application configuration parameters. For example, the operations may permit the addition of a firewall or an application server or a change to the CPU or memory allocation of a virtual machine.

The load source 130 is depicted as including one or more load generators 132 and a load controller 134. Generally speaking, the load source 130 comprises a workload generation tool that generates various workloads that may be assigned to the systems contained in the shared virtualized resource pool 124. The load source 130 may comprise any reasonably suitable workload generation tool that is operable with the SLiM tool 120. An example of a suitable workload generation tool is LoadRunner™ available from the Hewlett-Packard Co., of Palo Alto, Calif. An example of another suitable workload generation program tool is described in the article by Dumitrescu et al., entitled, "DiPerf: an automated DIstributed PERformance testing Framework", the disclosure of which is hereby incorporated by reference in its entirety.

With particular reference to the LoadRunner™ workload generation tool, the workload generation tool is highly scalable and has a centralized management console, such as, the load controller 134. The load controller 134 provides a programmable interface to manage the execution of tests. The programmable interface is used to cause the load generator(s) 132 to submit loads to the SUT 125, to periodically query the status of the test, and to push performance data gathered by the load source 130 to a persistent performance database service.

The load controller 134 is configured to orchestrate an essentially unlimited number of virtual users (Vusers) that submit load to a SUT 125. The management console is used to define groups of Vusers, associate groups with scripts, and to collate data collected by load generators 132 and store that in a database, for instance, in the data store 140.

The load source 130 supports the concept of Vuser groups, where each group is able to execute a different user behavior script, which determines the behavior of Vusers. In addition, each group has a ramp up time for Vusers that describes how quickly Vusers are introduced into an experiment. The load source 130 may manipulate the number of groups, their populations, and think times to cause specific workload mixes for a SUT 125.

The VATS test controller 102 receives the various workload mixes, which may comprise a plurality of different SUTs 125, from the load source 130. The VATS test controller 102 passes a model (specification) of the SUT 125 and the load source 130 to the SLiM tool 120, which interacts with the cloud controller 122 to instantiate the infrastructure systems in the shared virtualized resource pool 124 needed to support the SUT 125 and the load source 130. In other words, the SliM tool 120 interacts with the cloud controller 122 to obtain resources from the shared virtualized resource pool 124, to cause the deployment of the SUT 125 to the obtained resources, and to start the components of the obtained resources. The VATS test controller 102 is further configured to interact with the SLiM tool 120 to dynamically create the load source 130, for instance, as tests are being performed on the infrastructure systems in the shared virtualized resource pool 124 to, for instance, provide sufficient capacity in the load source 130 to enable parallel load testing on the infrastructure systems.

When there are multiple SUTs 125 to be tested, the VATS test controller 102 is configured to cause the multiple SUTs 125 to be tested in one of a serial and a parallel manner. According to an example, the VATS test controller 102 is able to cause parallel execution of the multiple SUTs 125 because of the generally abundant and diversely configured components in the shared virtualized resource pool 124.

The VATS test controller 102 is further configured to gather application specific monitoring data from the SUT(s) 125 through the SUT monitor 126 during and/or following completion of a test. The SUT monitor 126 may comprise a SUT specific monitoring interface that is exposed by the SLiM tool 120 or any reasonably suitable SUT monitor, such as, SiteScope™ available from the Hewlett-Packard Co., of Palo Alto, Calif. In any regard, the SUT monitor 126 may be configured to gather and report additional performance data for physical and virtual resources, and for application specific measurements. By way of example, the SUT monitor 126 may be configured for deployment and configuration along with a service instance for application specific measurements. For physical resource measurements, the SUT monitor 126 may be configured to access measurements from the shared virtualized resource pool 124.

In addition to receipt of performance data from the SUT monitor 126, the VATS test controller 102 is further configured to receive metrics information from the perspective of Vusers collected by the load source 130, such as, response times, request error rates, and standard information from hosts, such as CPU utilization.

According to an example, the VATS test controller 102 is configured to periodically check during the execution of a SUT 125 as to whether significant errors have occurred or whether the number of failed or aborted application requests or Vusers exceeds a threshold. In the event that any of these conditions have occurred, the VATS test controller 102 may abort and/or retry a test.

The VATS test controller 102 is configured to push the performance data gathered by the SUT monitor 120 and the load source 130 to a persistent performance database service, which may be contained in the data store 140. The data store 140 comprises any device capable of storage of information or any combination of devices capable of storage of information, such as, a semiconductor device, a magnetic disk memory device, nonvolatile memory devices, such as, an EEPROM or CDROM, etc. The data store 140 may also comprise a fixed or removable data storage device.

In addition, or alternatively to storing the performance data in the data store 140, the VATS test controller 102 is configured to report the gathered performance data (test results 152) out through an output device 150. The output device 150 may comprise, for instance, a network interface, a display monitor, a printer, etc., that enables the VATS test controller 102 to communicate the test results 152 to one or more users.

Unless otherwise specified, the components of the automated testing system 100 comprise software, firmware, hardware, or a combination thereof. Thus, for instance, one or more of the SLiM tool 120, the load source 130, the cloud controller 122, and the SUT monitor 126 may comprise software modules stored on one or more computer readable media. Alternatively, one or more of these components may comprise hardware modules, such as circuits, or other devices configured to perform the functions of these components as described above.

An example of a method of implementing the virtualized-aware automated testing system 100 will now be described with respect to the following flow diagram of the method 200 depicted in FIG. 2. It should be apparent to those of ordinary skill in the art that the method 200 represents a generalized illustration and that other steps may be added or existing steps may be removed, modified or rearranged without departing from a scope of the method 200.

The description of the method 200 is made with reference to the virtualized-aware automated testing system 100 illustrated in FIG. 1, and thus makes reference to the elements cited therein. It should, however, be understood that the method 200 is not limited to the elements set forth in the virtualized-aware automated testing system 100. Instead, it should be understood that the method 200 may be practiced by a system having a different configuration than that set forth in the virtualized-aware automated testing system 100.

Figure 2:
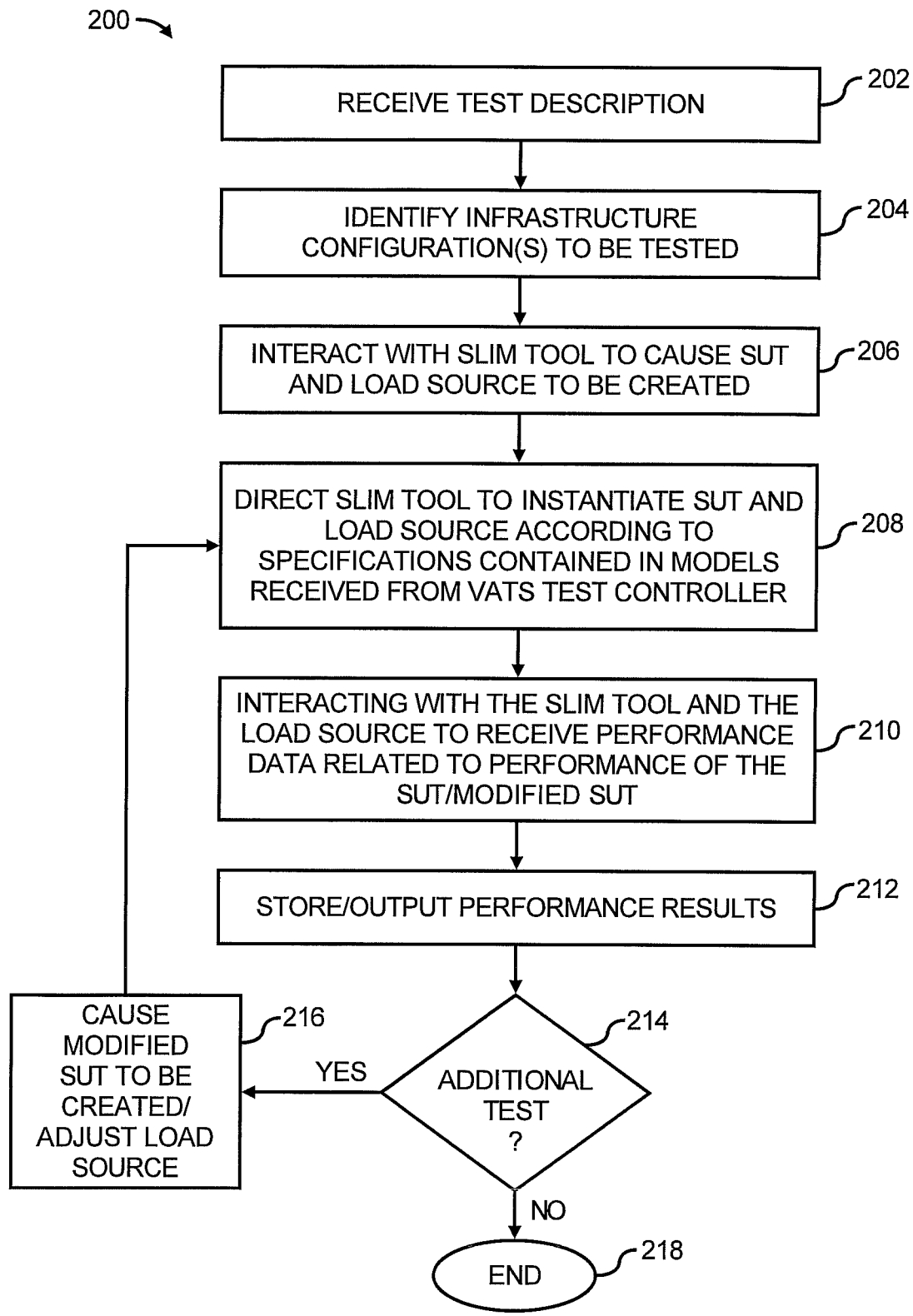
FIG. 2 illustrates a flow diagram of a method automated test execution in a shared virtualized resource pool, according to an embodiment of the invention.

Turning to FIG. 2, there is shown a flow diagram of a method 200 for automated test execution in a shared virtualized resource pool 124, according to an example. The method 200 may be initiated when the virtualized-aware automated testing system 100 receives a test description 112 containing at least one model for a service under test (SUT) 125, at step 202, which may cause the VATS test controller 102 to be instantiated and deployed. The test description 112 includes high level goals of metrics that a user would like to test or evaluate. For instance, the test description 112 includes multiple configurations for an infrastructure to be tested by the automated testing system 100.

At step 204, the VATS test controller 102 identifies the one or more infrastructure configurations to be tested by resources in the shared virtualized resource pool 124 based upon the test description 112. Thus, by way of particular example, the VATS test controller 102 may identify that the test description 112 is seeking to determine how a system behaves with different memory sizes and may thus identify that a first infrastructure configuration is to include an application server having 1 GB of memory and that another infrastructure configuration is to include an application server having 2 GB of memory. The VATS test controller 102 may also identify whether the test description 112 seeks to test performance based upon additional infrastructure configurations, such as, whether other application servers are to be loaded and to what levels. In this regard, the VATS test controller 102 may analyze the test description 112 to identify infrastructure configurations that mimic multiple, such as, real-life, worst-case, etc., scenarios to be used in performing the tests.

At step 206, the VATS test controller 102 interacts with the SLiM tool 120 to cause a SUT 125 and a load source 130 to be created. More particularly, for instance, the VATS test controller 102 interacts with the SLiM tool 120 by passing a model (specification) of the SUT 125 and load source 130 to the SLiM tool 120 to create both the SUT 125 and the load source 130. The model may include a description of the workloads to be performed by the systems in the identified infrastructure configurations supplied by the load source 130. In addition, the load generator(s) 132 and the load controller 134 are controllers that are used to execute workloads against the system.

At step 208, the VATS test controller 102 directs the SLiM tool 120 to instantiate the SUT 125 and the load source 130 according to the specifications contained in the models received from the VATS test controller 102. More particularly, for instance, the SLiM tool 120 configures the infrastructure, installs and starts all of the necessary components on the infrastructures. In one example, the SLiM tool 120 instantiates the SUT 125 and the load source 130 by interacting with a cloud controller 122 to configure the infrastructure configurations to be tested, to install and to start all of the necessary components on the infrastructure. At step 208, the interaction between the SLiM tool 120 and the cloud controller 122 is configured to cause the cloud controller 122 to set up the virtual machines (VMs) and the SLiM tool 120 to deploy the workloads generated by the load source 130 onto the VMs. Thus, at step 208, a test of the SUT 125 in the identified infrastructure configuration is performed. In addition, the load source 130 may continue to vary the loading conditions on the identified infrastructure configuration as provided by the load generator(s) 132 as part of the test under direction from the VATS test controller 102. Thus, for instance, as the test is being performed, the load generator(s) 132 may add additional users into the SUT 125, as directed by the VATS test controller 102.

At step 210, the VATS test controller 102 interacts with the SLiM tool 120 and the load source 130 to receive performance data related to performance of the SUT 125 under one or more loads generated by the load source 130 during step 208. As discussed above, the SUT monitor 126 is exposed to the SLiM tool 120 and thus, the SLiM tool 120 receives performance data for physical and virtual resources and for application specific measurements made by the SUT monitor 126 during performance of the SUT 125. As additionally discussed above, the load source 130 collects metrics from the perspective of Vusers, which the VATS test controller 102 may receive through interaction with the load source 130.

Additionally as an optional operation at step 210, the VATS test controller 102 may periodically check during the execution of a test as to whether significant errors have occurred or whether the number of failed or aborted application requests or Vusers exceeds a threshold and may abort and/or retry a test in the event that any of these conditions have occurred.

At step 212, the VATS test controller 102 stores the performance data gathered by the SUT monitor 120 and the load source 130 to a persistent performance database service, which may be contained and the data store 140. In addition, or alternatively, at step 212, the VATS test controller 102 outputs the gathered performance data through an output device 150.

At step 214, the VATS test controller 102 determines whether at least one additional test is to be performed. The VATS test controller 102 may make this determination based upon instructions contained in the test description 112. For instance, in an example where the number of application servers and the memory size are factors to be considered, and the test description 112 indicates that there may be anywhere from one to three application servers and anywhere from one to three different memory sizes, the VATS test controller 102 may determine that tests for each of the nine possible combinations are to be performed and may thus repeat steps 214 and 208-212 until tests for each of the possible combinations have been performed.

If the VATS test controller 102 determines that at least one additional test is to be performed at step 214, the VATS test controller 102 causes a modified SUT 125 to be created as indicated at step 216. In addition, or alternatively, the VATS test controller 102 may instruct the SLiM tool 120 to adjust the load source 130 at step 216, for instance, by adding or removing one or more load generators 132. In causing the modified SUT 125 to be created at step 216, the VATS test controller 102 interacts with the SLiM tool 120 and the load source 130 in a similar manner to step 206 discussed above. The modified SUT 125 may comprise the same test as previously run, but with different parameters. The various parameters that are changed in the modified SUT 125 may be based upon various parameter settings identified in the test description 112. In addition, or alternatively, the VATS test controller 102 may change the various parameters based upon results of previous tests. Thus, for instance, the VATS test controller 102 may select to increase a memory size of an application server in response to results of previous tests indicating that performance of the application server increased with previous increases in memory size.

The VATS test controller 102 then implements steps 208-212 again for the modified SUT 125 (or the modified load generator(s) 132) to identify the performance of the modified SUT 125. The VATS test controller 102 repeats steps 208-214 for a predetermined number of iterations, until all of the scheduled tests have been performed, until a desired result is identified, until manually terminated, etc. When the VATS test controller 102 determines that no additional tests are to be performed at step 214, the VATS test controller 102 may terminate the method 200, as indicated at step 218. In addition to terminating the method 200 at step 218, the VATS test controller 102 may also cause the resources used for the test to be returned back to the shared virtualized resource pool via the SLiM tool 120 and the cloud controller 122.

According to an example, the VATS test controller 102 causes additional tests to be performed at steps 216 and 208-214 as tests are concluded. In this example, therefore, the VATS test controller 102 causes the tests to be executed in series with respect to each other.

According to another example, the VATS test controller 102 identifies multiple infrastructure configurations to be tested at step 204. In this example, the VATS test controller 102 interacts with the SLiM tool 120 and the load source 130 to cause multiple SUTs 125 to be created at step 206. In addition, at step 208, the VATS test controller 102 instantiates the SLiM tool 120 to interact with the cloud controller 122 to instantiate the identified infrastructure configurations in the shared virtualized resource pool 124 for the plurality of SUTs 125, which causes the tests to be performed on the components of the identified infrastructure configurations in parallel with each other. Moreover, at step 210, the VATS test controller 102 interacts with the SLiM tool 120 and the load source 122 to receive performance data related to the performance of the plurality of SUTs 125. The VATS test controller 102 also interacts with the SLiM tool 120 and the load source 122 to receive performance data related to performance of the plurality of SUTs 125 at step 210 and stores/outputs the performance results at step 212. The VATS test controller 102 also determines whether at least one additional test is to be performed at step 214 and performs steps 216 and 208-214 in response to a determination that at least one additional test is to be performed. Otherwise, the VATS test controller 102 ends the method 200 at step 218.

The VATS test controller 102 may implement or execute the method 200 to support various types of tests. In a first example, the VATS test controller 102 may implement or execute the method 200 to perform a threshold or a limit test to determine, for instance, the maximum number of users supported by a given infrastructure configuration in the shared virtualized resource pool 124 at required response time levels. In this example, the load generator(s) 132 may add a user every number of seconds and execute the workload until the maximum number of users is determined to have been reached while remaining below the desired response time level. The maximum number of users may be determined to have been reached, for instance, when a predefined response time threshold has been reached.

In a second example, the VATS test controller 102 may implement or execute the method 200 to perform a capacity test to determine, for instance, whether an infrastructure configuration allows a predetermined number of users to be supported at required throughput and response time levels. In this example, the number of users, for instance, Vusers, is fixed and the systems of the infrastructure configuration are observed while the test is being performed to determine whether the system has sufficient capacity to support the predetermined number of users. The VATS test controller 102 is thus configured to output an indication as to whether the infrastructure configuration either passed or failed the capacity test based upon the observation.

Through implementation of the VATS test controller 102 and the method 200, a user may identify how much resources will be needed to provide a certain level of performance or how a change to a system will affect the level of performance. By way of particular example, if a new system instance is desired, the VATS test controller 102 may be implemented to properly size an infrastructure to provide a desired performance behavior. Thus, for instance, a user may implement the VATS test controller 102 and the method 200 to identify how much resources an application as a service instance will require when it runs in a shared virtualized resource pool 124 to provide the user or a client with certain levels of service.

The VATS test controller 102 may implement or invoke the method 200 using test patterns, which are available for singleton experiments, for full factorial experiments, and for one factor at a time optimizations. An iteration of a test corresponds to one run for a set of factor levels. An iteration may be replicated many times for the same factor levels so that confidence intervals may be obtained for measured values. A singleton experiment may have one or more factors but each factor has one level. A full factorial experiment executes separate iterations for all combinations of factor levels. A one factor at a time optimization varies the level of one factor at a time, in a defined order, while optimizing with respect to a response time objective. Each factor has an initial level that does not change until it is the factor being varied. Real and Integer factor levels may be explored using a binary search. Categorical factor levels are evaluated using the specified sequence.

Figure 3:
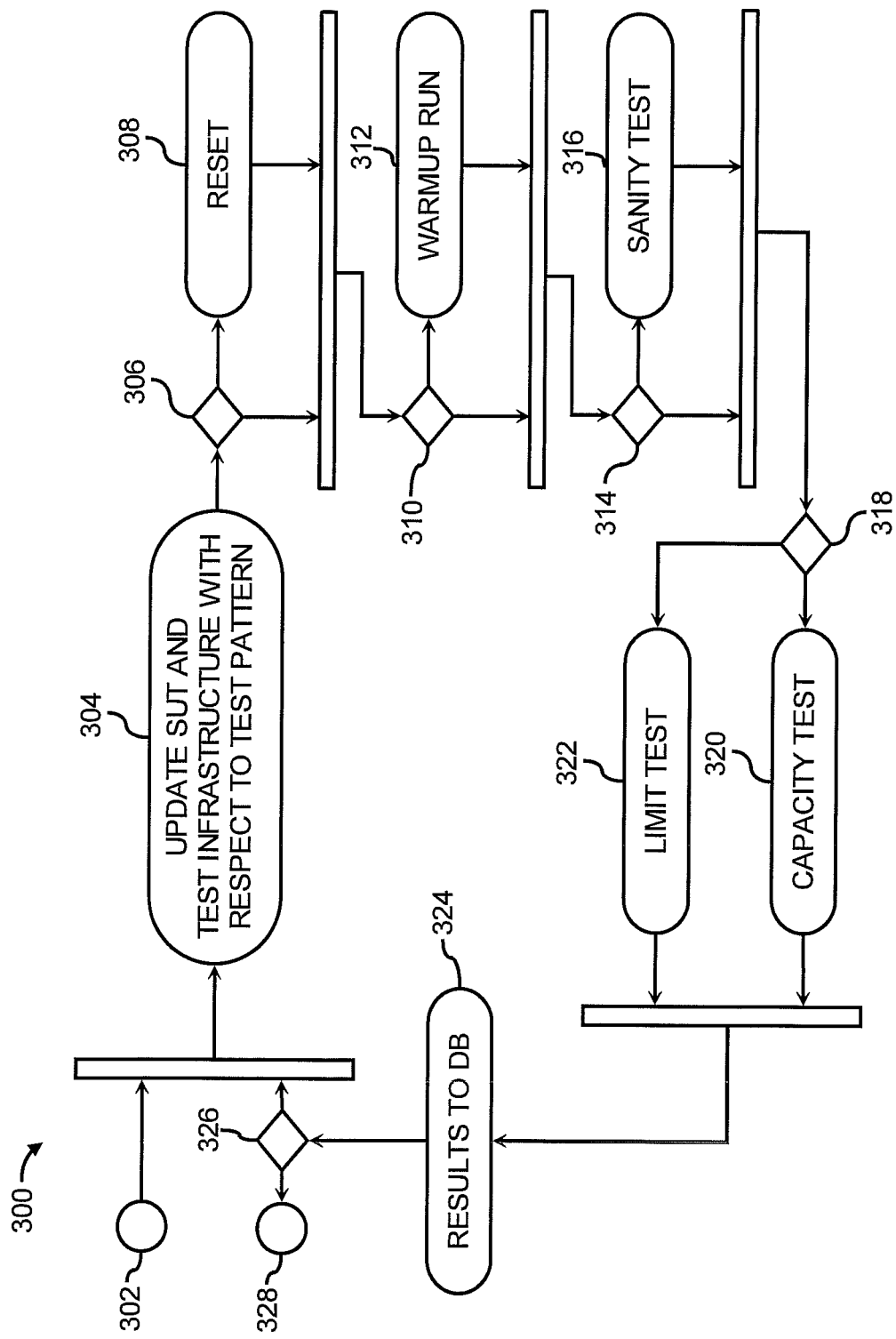
FIG. 3 shows a flow diagram of control for a single iteration of a test, according to an embodiment of the invention.

With reference to FIG. 3, there is shown a flow diagram 300 of control for a single iteration of a test, according to an embodiment. It should be apparent to those of ordinary skill in the art that the method 300 represents a generalized illustration and that other steps may be added or existing steps may be removed, modified or rearranged without departing from a scope of the method 300. For instance, operations in addition to those depicted in FIG. 3 may be included in the method 300 to verify and ensure the accuracy of the tests performed by the VATS test controller 102.

The flow diagram 300 represents steps that may be performed during or before performance of step 208 for the SUT 125 or the modified SUT 125. The flow diagram 300 is initiated at step 302, in which the VATS test controller 102 receives a test description 112. At step 304, the VATS test controller 102 updates the SUT 125 and test infrastructure with respect to a test pattern as identified from the test description 112.

At step 306, the VATS test controller 102 determines whether a system is currently running or has been run. If it is determined that a system is currently running or has been run, the VATS test controller 102 may reset and restart the SUT 125 services, such as, databases and virtual machines, as indicated at step 308.

At step 310, the VATS test controller 102 determines whether a warmup run is to be performed. If it is determined that a warmup run is to be performed, the VATS test controller 102 causes a warmup load generation phase be performed prior to the collection of measurements at step 312. The VATS test controller 102 may perform the warmup run at step 312 to set the system in a well-known state. The warmup run may be performed to load some caches and some buffers to desired levels prior to performing the test on the system thus creating comparable results across multiple test runs.

At step 314, the VATS test controller 102 determines whether a sanity test is to be performed. If it is determined that a sanity test is to be performed, the VATS test controller 102 causes a sanity test to be performed at step 316. The VATS test controller 102 may perform the sanity test at step 316 to ensure that the system is able to change a large number of parameters of software running on the virtual machines, which could unintentionally render a system non-functional. As such, the sanity test is performed to basically determine whether a system still behaves as expected by running a series of steps and provides a desired result. In addition, the sanity test may be repeated after changes are made to ensure that the changes were successful.

At step 318, the VATS test controller 102 determines which type of test to perform. In one example, the VATS test controller 102 selects to perform the capacity test at step 320, as discussed above. In another example, the VATS test controller 102 selects to perform the limit test at step 322, as also discussed above.

At step 324, one iteration of the limit test or the capacity test is completed and the results of the test are reported to the database. At step 326, the VATS test controller 102 determines whether another iteration of the test is to be performed or if the test has been concluded. If another iteration is to be performed, the VATS test controller 102 repeats steps 304-326, until the VATS test controller 102 determines that no further iterations are required. If no further iterations are required, the VATS test controller 102 ends the testing operation at step 328, which may include the release of the systems used during the testing back into the shared virtualized resource pool 124.

The operations set forth in the methods 200 and 300 may be contained as utilities, programs, or subprograms, in any desired computer accessible medium. In addition, the methods 200 and 300 may be embodied by computer programs, which may exist in a variety of forms both active and inactive. For example, they may exist as software program(s) comprised of program instructions in source code, object code, executable code or other formats. Any of the above may be embodied on a computer readable medium.

Exemplary computer readable storage devices include conventional computer system RAM, ROM, EPROM, EEPROM, and magnetic or optical disks or tapes. Concrete examples of the foregoing include distribution of the programs on a CD ROM or via Internet download. It is therefore to be understood that any electronic device capable of executing the above-described functions may perform those functions enumerated above.

Figure 4:
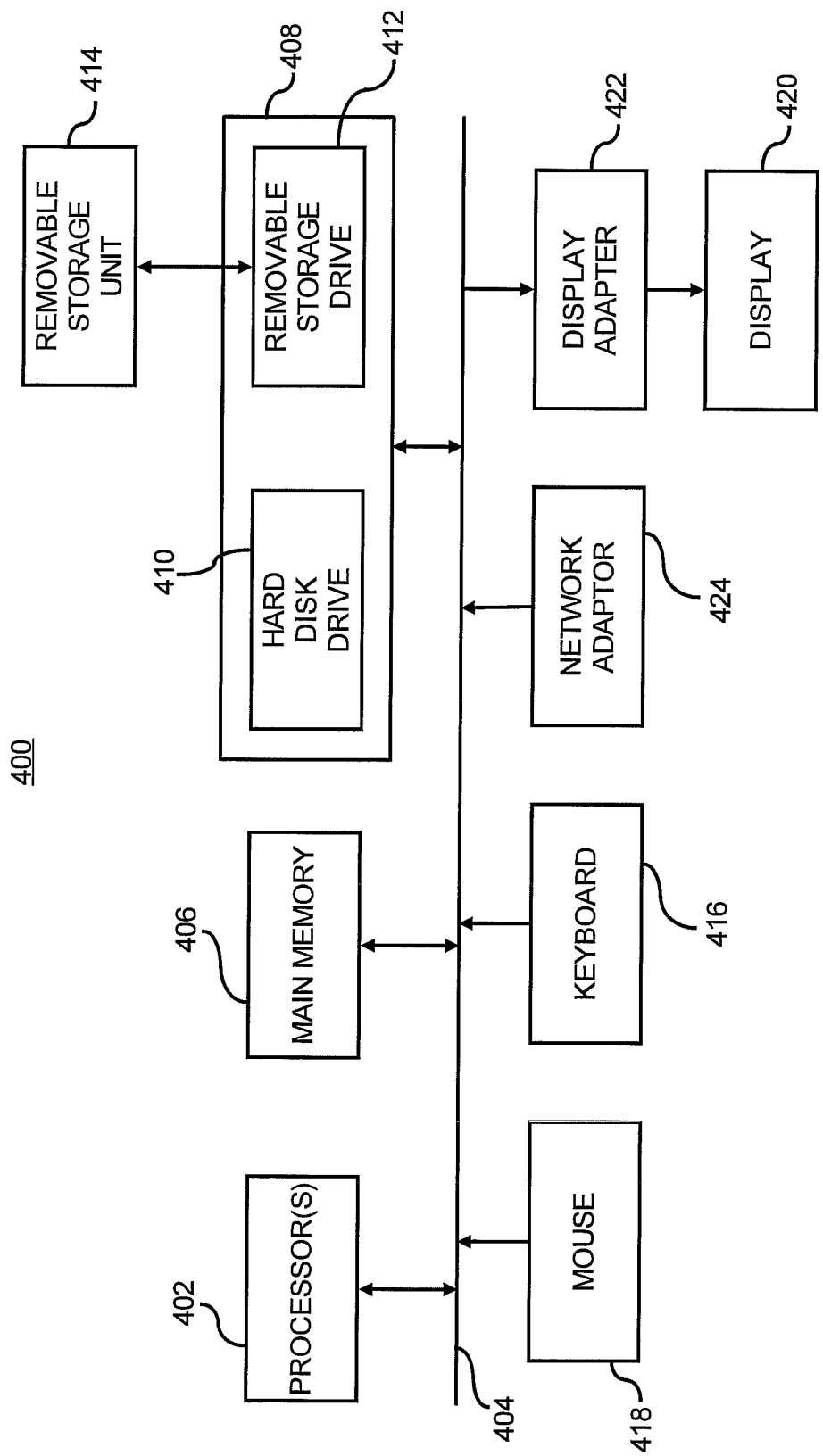
FIG. 4 illustrates a block diagram of a computing apparatus configured to implement or execute either or both of the methods depicted in FIGS. 2 and 3, according to an embodiment of the invention.

FIG. 4 illustrates a block diagram of a computing apparatus 400 configured to implement or execute either or both of the methods 200 and 300 depicted in FIGS. 2 and 3, according to an example. In this respect, the computing apparatus 400 may be used as a platform for executing one or more of the functions described hereinabove with respect to the VATS test controller 102 depicted in FIG. 1.

The computing apparatus 400 includes a processor 402 that may implement or execute some or all of the steps described in the methods 200 and 300. Commands and data from the processor 402 are communicated over a communication bus 404. The computing apparatus 400 also includes a main memory 406, such as a random access memory (RAM), where the program code for the processor 402, may be executed during runtime, and a secondary memory 408. The secondary memory 408 includes, for example, one or more hard disk drives 410 and/or a removable storage drive 412, representing a floppy diskette drive, a magnetic tape drive, a compact disk drive, etc., where a copy of the program code for the methods 200 and 300 may be stored.

The removable storage drive 412 reads from and/or writes to a removable storage unit 414 in a well-known manner. User input and output devices may include a keyboard 416, a mouse 418, and a display 420. A display adaptor 422 may interface with the communication bus 404 and the display 420 and may receive display data from the processor 402 and convert the display data into display commands for the display 420. In addition, the processor(s) 402 may communicate over a network, for instance, the Internet, LAN, etc., through a network adaptor 424.

It will be apparent to one of ordinary skill in the art that other known electronic components may be added or substituted in the computing apparatus 400. It should also be apparent that one or more of the components depicted in FIG. 4 may be optional (for instance, user input devices, secondary memory, etc.).

What has been described and illustrated herein is a preferred embodiment of the invention along with some of its variations. The terms, descriptions and figures used herein are set forth by way of illustration only and are not meant as limitations. Those skilled in the art will recognize that many variations are possible within the scope of the invention, which is intended to be defined by the following claims—and their equivalents—in which all terms are meant in their broadest reasonable sense unless otherwise indicated.

What is claimed is:

1. A computer-implemented method for automated test execution in a shared virtualized resource pool, said method comprising:
   receiving a test description containing at least one model for a service under test (SUT);
   identifying one or more infrastructure configurations to be tested by resources in the shared virtualized resource pool based upon the test description;
   interacting with a service lifecycle management (SLiM) tool to cause the SUT and a load source to be created;
   directing the SLiM tool to instantiate the SUT and the load source on the one or more infrastructure configurations in the shared virtualized resource pool; and
   interacting with the SLiM tool and the load source to receive performance data related to performance of the SUT under one or more loads generated by the load source.

2. The computer-implemented method according to claim 1, further comprising:
   at least one of storing the received performance results in a database and reporting the received performance results.

3. The computer-implemented method according to claim 1, further comprising:
   interacting with the SLiM tool to cause at least one of a modified SUT to be created and one or more load sources to be at least one of modified and created;
   directing the SLiM tool to instantiate the at least one of the modified SUT and the at least one of the modified and created one or more load sources on the one or more infrastructure configurations in the shared virtualized resource pool; and
   interacting with the SLiM tool and the at least one of the modified and created one or more load sources to receive performance data related to performance of the at least one of the modified SUT and the at least one of the modified and created one or more load sources.

4. The computer-implemented method according to claim 1, further comprising:

interacting with the SLiM tool to cause a plurality of SUTs to be created;

directing the SLiM tool to instantiate the plurality of SUTs on the one or more infrastructure configurations in the shared virtualized resource pool; and interacting with the SLiM tool and the load source to receive performance data related to the performance of the plurality of SUTs.

5. The computer-implemented method according to claim 4, wherein interacting with the SLiM tool further comprises interacting with the SLiM tool to cause the plurality of SUTs to be created sequentially upon completion of each test, and wherein directing the SLiM tool further comprises directing the SLiM tool to instantiate the plurality of SUTs on the one or more infrastructure configurations in the shared virtualized resource pool in series as each test is completed.

6. The computer-implemented method according to claim 4, wherein interacting with the SLiM tool further comprises interacting with the SLiM tool to cause the plurality of SUTs to be created in parallel, and wherein directing the SLiM tool further comprises directing the SliM tool to instantiate the plurality of SUTs on the one or more infrastructure configurations in the shared virtualized resource pool in parallel with each other to thereby cause a plurality of tests to be executed concurrently with each other.

7. The computer-implemented method according to claim 1, wherein the test description comprises at least one of a limit test and a capacity test.

8. A computer-implemented virtualized-aware automated testing controller comprising:

code for receiving a request for a test description that has at least one model for a service under test (SUT) and a description for the test;

code for identifying one of more infrastructure configurations to be tested by resources in a shared virtualized resource pool based upon the test description;

code for interacting with a service lifecycle management (SLiM) tool to cause the SUT and a load source to be created, wherein the SLiM tool is configured to instantiate the SUT and the load source on the one or more infrastructure configurations in the shared virtualized resource pool through interaction with a cloud controller configured to control provisioning of resources in the shared virtualized resource pool; and code for interacting with the SLiM tool and the load source to receive performance data related to performance of the SUT under one or more loads generated by the load source.

9. The computer-implemented virtualized-aware automated testing controller according to claim 8, further comprising:

code for at least one of storing the performance data received through interaction with the SLiM tool and the load source in a database and outputting the performance data received through interaction with the SLiM tool and the load source to an output device.

10. The computer-implemented virtualized-aware automated testing controller according to claim 8, further comprising:

code for interacting with the SLiM tool to cause at least one of a modified SUT to be created and one or more load sources to be at least one of modified and created;

code for directing the SLiM tool to instantiate the at least one of the modified SUT and the at least one of the modified and created one or more load sources on the one or more infrastructure configurations in the shared virtualized resource pool; and code for interacting with the SLiM tool and the at least one of the modified and created one or more load sources to receive performance data related to performance of the at least one of the modified SUT and the at least one of the modified and created one or more load sources.

11. The computer-implemented virtualized-aware automated testing controller according to claim 8, further comprising:

code for interacting with the SLiM tool to cause a plurality of SUTs to be created;

code for directing the SLiM tool to instantiate the plurality of SUTs on the one or more infrastructure configurations in the shared virtualized resource pool; and code for interacting with the SLiM tool and the load source to receive performance data related to the performance of the plurality of SUTs.

12. The computer-implemented virtualized-aware automated testing controller according to claim 11, wherein the code for directing the SLiM tool to instantiate the plurality of SUTs further comprises code for directing the SLiM tool to instantiate the plurality of SUTs on the one or more infrastructure configurations in the shared virtualized resource pool in a parallel manner to enable a plurality of tests to be executed concurrently with each other.

13. A non-transitory computer readable storage medium on which is embedded one or more computer programs, said one or more computer programs implementing a method for automated test execution in a shared virtualized resource pool, said one or more computer programs comprising a set of instructions for:

receiving a test description containing at least one model for a service under test (SUT);

identifying one of more infrastructure configurations to be tested by resources in a shared virtualized resource pool based upon the test description;

interacting with a service lifecycle management (SLiM) tool to cause the SUT and a load source to be created, wherein the SLiM tool is configured to instantiate the SUT and the load source on the one or more infrastructure configurations in the shared virtualized resource pool through interaction with a cloud controller configured to control provisioning of resources in the shared virtualized resource pool; and interacting with the SLiM tool and the load source to receive performance data related to performance of the SUT under one or more loads generated by the load source.

14. The non-transitory computer readable storage medium according to claim 13, said one or more computer programs comprising a further set of instructions for:

interacting with the SLiM tool to cause a plurality of SUTs to be created;

directing the SLiM tool to instantiate the plurality of SUTs on the one or more infrastructure configurations in the shared virtualized resource pool for the plurality of SUTs in at least one of a serial and a parallel manner, wherein interacting with the SLiM tool and the load source further comprises interacting with the SLiM tool and the load source to receive performance data related to performance of the plurality of SUTs.

15. The non-transitory computer readable storage medium according to claim 14, said one or more computer programs comprising a further set of instructions for:

interacting with the SLiM tool to cause at least one of a modified SUT to be created and one or more load sources to be at least one of modified and created;

directing the SLiM tool to instantiate the at least one of the modified SUT and the at least one of the modified and created one or more load sources on the one or more infrastructure configurations in the shared virtualized resource pool; and interacting with the SLiM tool and the at least one of the modified and created one or more load sources to receive performance data related to performance of the at least one of the modified SUT and the at least one of the modified and created one or more load sources.

* * * * *